(12) United States Patent
Miranda et al.

(10) Patent No.: US 9,416,060 B2
(45) Date of Patent: *Aug. 16, 2016

(54) AGRICULTURAL BLEND, AGRICULTURAL BINDER SYSTEM, AND PROCESS OF FORMING AN AGRICULTURAL BLEND

(71) Applicant: HARSCO CORPORATION, Camp Hill, PA (US)

(72) Inventors: Stephen R. Miranda, Coraopolis, PA (US); Kimberly A. Papania, Sarver, PA (US)

(73) Assignee: HARSCO CORPORATION, Camp Hill, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/612,909

(22) Filed: Feb. 3, 2015

(65) Prior Publication Data
US 2015/0152016 A1 Jun. 4, 2015

Related U.S. Application Data

(63) Continuation of application No. 13/821,985, filed as application No. PCT/US2011/051063 on Sep. 9, 2011, now Pat. No. 9,108,889, which is a continuation of application No. 12/879,432, filed on Sep. 10, 2010, now Pat. No. 8,734,560.

(51) Int. Cl.
*C05D 9/00* (2006.01)
*C09K 17/02* (2006.01)
(Continued)

(52) U.S. Cl.
CPC ... *C05D 3/04* (2013.01); *B01J 2/00* (2013.01); *B09C 1/08* (2013.01); *C05B 5/00* (2013.01); *C05C 3/00* (2013.01); *C05D 3/00* (2013.01);
(Continued)

(58) Field of Classification Search
None
See application file for complete search history.

(56) References Cited

U.S. PATENT DOCUMENTS

| 2,903,349 A | 9/1959 | Bryant |
| 3,137,565 A | 6/1964 | Hayes |

(Continued)

FOREIGN PATENT DOCUMENTS

| CN | 86107166 A | 5/1988 |
| CN | 1030567 A | 1/1989 |

(Continued)

OTHER PUBLICATIONS

Notification of Transmittal of the International Search Report and the Written Opinion of the International Searching Authority, or the Declaration, Mail Date: Sep. 30, 2015; PCT/US2011/051095; International Filing Date: Sep. 9, 2011; Applicant: HARSCO.

(Continued)

*Primary Examiner* — Wayne Langel
(74) *Attorney, Agent, or Firm* — McNees Wallace & Nurick LLC

(57) ABSTRACT

An agricultural blend, an agricultural binder system, and a process of forming an agricultural blend are described. The agricultural blend includes a binder system having soy polymer and one or both of metal slag by-product and synthetic gypsum. The agricultural binder system includes soy polymer. The agricultural binder system is a powder. The process of forming an agricultural blend includes blending a binder system having soy polymer with one or both of metal slag by-product and synthetic gypsum to form the agricultural blend.

20 Claims, 1 Drawing Sheet

(51) Int. Cl.

| | | |
|---|---|---|
| C09K 17/04 | (2006.01) | |
| C09K 17/06 | (2006.01) | |
| C05D 3/04 | (2006.01) | |
| C05B 5/00 | (2006.01) | |
| C05D 3/00 | (2006.01) | |
| B09C 1/08 | (2006.01) | |
| B01J 2/00 | (2006.01) | |
| C05C 3/00 | (2006.01) | |
| C05D 3/02 | (2006.01) | |
| C05D 5/00 | (2006.01) | |
| C05D 9/02 | (2006.01) | |
| C05G 1/00 | (2006.01) | |
| C05G 3/08 | (2006.01) | |

(52) U.S. Cl.
CPC .. *C05D 3/02* (2013.01); *C05D 5/00* (2013.01); *C05D 9/00* (2013.01); *C05D 9/02* (2013.01); *C05G 1/00* (2013.01); *C05G 3/08* (2013.01); *C09K 17/02* (2013.01); *C09K 17/04* (2013.01); *C09K 17/06* (2013.01)

(56) References Cited

U.S. PATENT DOCUMENTS

| | | |
|---|---|---|
| 3,232,738 A | 2/1966 | Bahme |
| 3,241,947 A | 3/1966 | Young |
| 3,303,016 A | 2/1967 | Boukidis |
| 3,979,199 A | 9/1976 | Collins et al. |
| 4,246,019 A | 1/1981 | Sokolov et al. |
| 4,248,617 A | 2/1981 | Kamo et al. |
| 4,272,293 A | 6/1981 | Hooykaas |
| 4,305,748 A | 12/1981 | Bechthold et al. |
| 4,334,908 A | 6/1982 | Duchateau et al. |
| 4,985,060 A | 1/1991 | Higa |
| 5,158,594 A | 10/1992 | Oxford |
| 5,215,672 A | 6/1993 | Rogers et al. |
| 5,362,471 A | 11/1994 | Roth et al. |
| 5,413,616 A | 5/1995 | Bolsing |
| 5,487,772 A | 1/1996 | McCoy |
| 5,510,094 A | 4/1996 | Bhat et al. |
| 5,603,744 A | 2/1997 | Kurner |
| 5,605,557 A | 2/1997 | Hall |
| 5,620,498 A | 4/1997 | Ebert et al. |
| 5,627,133 A | 5/1997 | Nelson |
| 5,628,811 A | 5/1997 | College et al. |
| 5,743,934 A | 4/1998 | Wommack et al. |
| 5,743,935 A | 4/1998 | Hall |
| 5,997,599 A | 12/1999 | Wommack et al. |
| 6,036,740 A | 3/2000 | Miller et al. |
| 6,053,958 A | 4/2000 | Wilson |
| 6,074,988 A | 6/2000 | King et al. |
| 6,274,111 B1 | 8/2001 | Bauer et al. |
| 6,939,387 B2 | 9/2005 | Elizer |
| 7,341,667 B2 | 3/2008 | Kennard et al. |
| 7,449,118 B2 | 11/2008 | Kennard et al. |
| 7,479,230 B2 | 1/2009 | Kennard et al. |
| 7,744,691 B2 | 6/2010 | Elizer et al. |
| 8,734,560 B2 | 5/2014 | Miranda et al. |
| 9,108,889 B2* | 8/2015 | Miranda ............ C05D 3/04 |
| 9,133,069 B2* | 9/2015 | Miranda ............ C05B 5/00 |
| 2001/0029762 A1* | 10/2001 | Steele ............ B01J 20/28004 71/63 |
| 2002/0007656 A1 | 1/2002 | Iwasaki et al. |
| 2003/0097863 A1 | 5/2003 | Wommack et al. |
| 2003/0126898 A1 | 7/2003 | You |
| 2004/0009878 A1 | 1/2004 | Lynch et al. |
| 2004/0031304 A1 | 2/2004 | Elizer |
| 2004/0221631 A1 | 11/2004 | Kerrigan |
| 2005/0016421 A1 | 1/2005 | Fujimori et al. |
| 2005/0111923 A1 | 5/2005 | Maile et al. |
| 2005/0126238 A1 | 6/2005 | Gordon |
| 2005/0241354 A1 | 11/2005 | Wommack et al. |
| 2006/0117655 A1 | 6/2006 | Bodycomb et al. |
| 2006/0180090 A1* | 8/2006 | Odom ............ A01N 25/08 119/171 |
| 2007/0163316 A1* | 7/2007 | Fedkenheuer ............ C05C 9/00 71/11 |
| 2007/0169527 A1 | 7/2007 | Wynnyk et al. |
| 2007/0272609 A1 | 11/2007 | Suri et al. |
| 2007/0295046 A1 | 12/2007 | Cassan |
| 2008/0098782 A1 | 5/2008 | Urano et al. |
| 2009/0145191 A1 | 6/2009 | Elizer et al. |
| 2010/0139346 A1* | 6/2010 | Burnham ............ C05G 3/0088 71/12 |
| 2010/0275666 A1 | 11/2010 | Matichenkov |
| 2011/0000855 A1 | 1/2011 | Kuhel et al. |
| 2011/0247379 A1* | 10/2011 | Cannock ............ C05D 3/00 71/23 |
| 2012/0060575 A1 | 3/2012 | Miranda et al. |

FOREIGN PATENT DOCUMENTS

| | | |
|---|---|---|
| CN | 101362009 A | 2/2009 |
| CN | 101265136 B | 9/2010 |
| CN | 101429068 B | 4/2011 |
| DE | 1302386 B | 7/1971 |
| EP | 1481956 A1 | 1/2004 |
| FR | 281975 | 1/1908 |
| GB | 190403688 A | 2/1905 |
| GB | 313612 A | 7/1930 |
| GB | 359919 A | 10/1931 |
| GB | 2031866 | 4/1980 |
| JP | 55055719 | 4/1980 |
| JP | 60145982 A | 8/1985 |
| JP | 2007306844 | 11/2007 |
| KR | 1020040028144 A | 4/2004 |
| KR | 20050073162 A | 7/2005 |
| WO | 0158831 A1 | 8/2001 |
| WO | 2009004434 A2 | 1/2009 |
| WO | 2011059328 A1 | 5/2011 |

OTHER PUBLICATIONS

Database WPI, Week 198537, Thomson Scientific, London, GB; AN 2008-B45171; XP002667236, & JP 2007 306844 A (Kawashige Plant KK) Nov. 29, 2007 abstract 1,2,6-10,13-17.

Database WPI, Week 198537, Thomson Scientific, London, GB; AN 1985-226279; XP002667235,& JP 60 145982 A (Nippon Chem Ind Co Ltd) Aug. 1, 1985, abstract 1,2,6-10,13-17.

Database WPI, Week 200654, Thomson Scientific, London, GB; AN 2006-526281; XP002667237,& KR 2005 0073162 A (POS Ceramics Co Ltd) Jul. 13, 2005, abstract 1,2,6-10,13-17.

DE 13 02 386 B (Zimmermann, Friedrich), Jul. 29, 1971; the whole document.

Database Compendex [Online], Engineering Information, Inc., New York, NY, US; Dec. 1975, Burdo R A et al: "Determination of Silicon in Glasses and Minerals by Atomic Absorption Spectrometry." ,XP002744709, Database accession No. E1X76020002350 abstract & Analytical Chemistry Dec. 1975, vol. 47, No. 14, Dec. 1975, pp. 2360-2364.

Database Biosis [Online]; Biosciences Information Service,Philadelphia, PA, US; 1980, Lichte F E et al: "Determination of Silicon and Aluminum in Biological Matrices by Inductively Coupled Plasma Emission Spectrometry", XP002744710, Database accession No. PREV198069069145 abstract & Analytical Chemistry, vol. 52, No. 1, 1980, pp. 120-124, ISSN: 0003-2700; 3-5, 18.

Pro Sol Material Safety Data Sheet, May 6, 2005.

Freedom Industries, Inc. Material Safety Data Sheet, FreedomBinder 5000, pp. 1-6, Mar. 7, 2006.

Lee, Deishin, Turning Waste into By-Product, pp. 1-43, Harvard Business School, copyright 2007, 2009, 2010, 2011, Jan. 2011.

A Guide for the Use of Steel Slag in Agriculture and for Reclamation of Acidic Lands, National Slag Association, www.nationalslag.org, obtained May 23, 2013.

(56) References Cited

OTHER PUBLICATIONS

CemStar Process: Slag Usage Raises Productivity, Operational Efficiency, Lowers Emissions, National Slag Association, Jun. 14, 2002, www.nationalslag.org.

Leachate from Blast Furnace Slag, National Slag Association, Apr. 8, 2003, www.nationalslag.org.

1-70 Glenwood Canyon "Begs for the Ultimate Asphalt Mix Design"—Executive Summary, National Slag Association, www.nationalslag.org, obtained May 23, 2013.

Steel Furnace Slag SMA Mix Proves to be "The World's Strongest Intersection", National Slag Association, NSA 203-1, www.nationalslag.org, obtained May 23, 2013.

The Cure for Permanent Pavement Deformation, NSA 203-6, National Slag Association, www.nationalslag.org, obtained May 23, 2013.

Pereira, et al. Extractors of Available Silicon in Slags and Fertilizers, R. Bras. Ci. Solo, 27:265-274, 2003.

"Differences in Calcium Silicate Slags", TerraSi-1919 Calcium Silicate Soil Conditioner, Product Information Bulletin, (approx. 2008-2009).

"Effect of Elemental Sulfur, Gypsum, and Elemental Sulfur Coated Fertilizers, on the Availability of Sulfur to Rice", Navida Yasmin, et al., Journal of Plant Nutrition, 30:79-91, 2007 www.tandfonline.com, Mar. 13, 2007.

\* cited by examiner

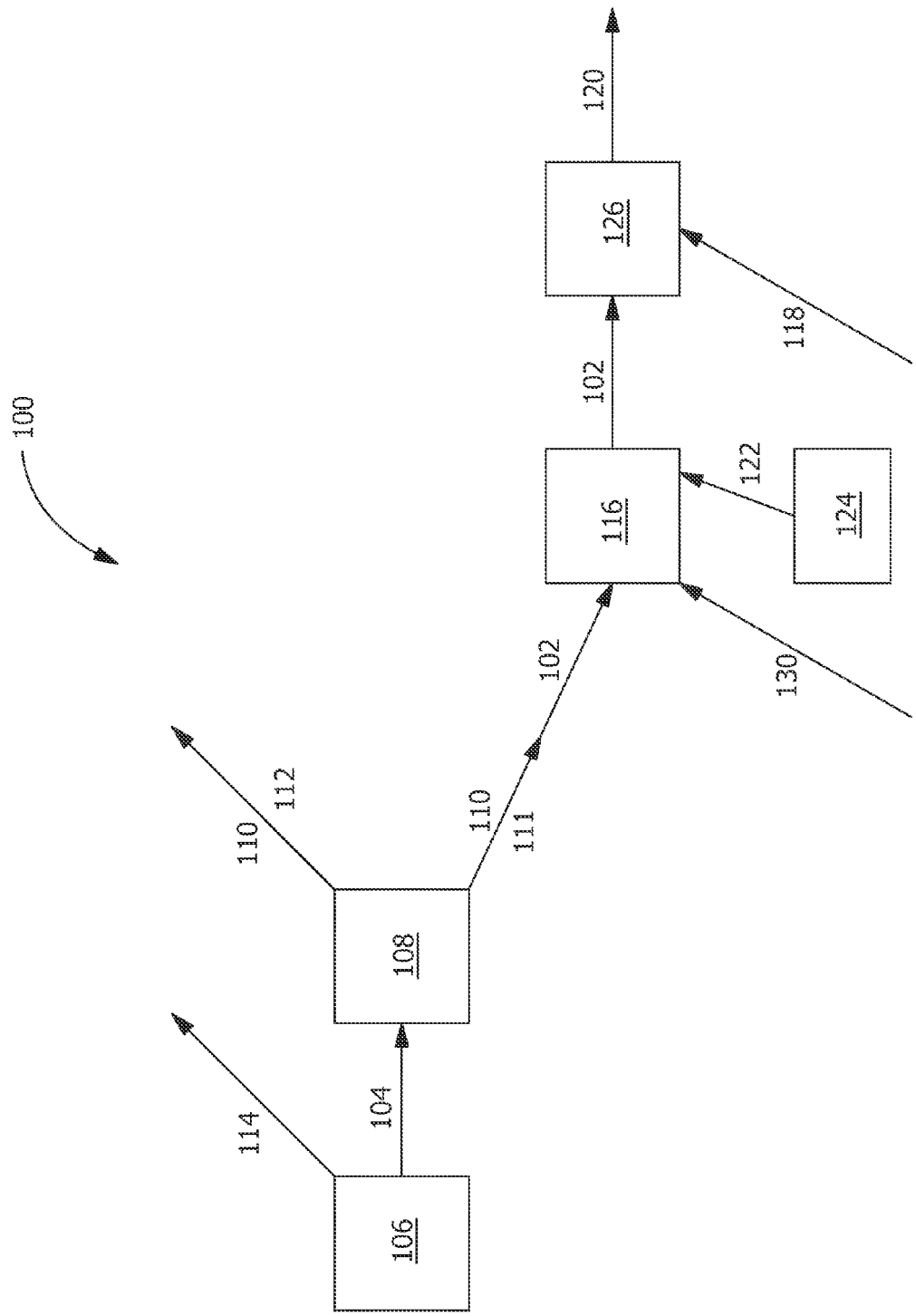

US 9,416,060 B2

AGRICULTURAL BLEND, AGRICULTURAL BINDER SYSTEM, AND PROCESS OF FORMING AN AGRICULTURAL BLEND

PRIORITY

This application is a continuation of U.S. patent application Ser. No. 13/821,985, titled "AGRICULTURAL BLEND AND PROCESS OF FORMING AN AGRICULTURAL BLEND," filed Jun. 24, 2013, which is a National Stage Application of PCT International Patent Application No. PCT/US11/51064, titled AGRICULTURAL BLEND AND PROCESS OF FORMING AN AGRICULTURAL BLEND, filed Sep. 9, 2011.

FIELD OF THE INVENTION

The present invention is directed to agricultural blends and processes of forming agricultural blends. More specifically, the present invention is directed to agricultural blends containing silicon.

BACKGROUND OF THE INVENTION

Specific minerals are known to stimulate plant growth in agriculture. For example, fertilizers and other additives can contain silicon compounds, such as, calcium silicate, magnesium silicate, potassium silicate, and sodium silicate. Fertilizers and the other additives can deliver these minerals, these compounds, or combinations of these minerals and these compounds to a plant or to soil. The method of delivering the minerals or compounds, the crystal structure of the minerals or compounds, and the combination of the minerals or compounds impacts the efficacy of the fertilizers and other additives, for example, by impacting the solubility of them. Soluble compounds are able to travel through soil, plants, and/or portions of plants (such as a cell wall) better than insoluble compounds.

The minerals or compounds in the fertilizers or other additives are produced in several forms. For example, the minerals or compounds in the fertilizers or other additives can be natural (for example, mined) or synthetic (for example, a by-product of an industrial process). Utilizing synthetic minerals or compounds, such as, by-products, can be environmentally beneficial by reducing waste and economically beneficial by creating economic value to existing waste.

One such by-product is slag. Slag is generally perceived as a waste material. However, most slag can be used in road surfaces, roofing, or cementitious products. The source of slag impacts the composition of the slag and, thus, the end-use of the slag or portions of the slag. For example, blast furnace slag is known to be used in roads and cementitious products; however, it has previously been perceived as undesirable for agricultural products due to its composition. Stainless steel slag (greater than 10.5 weight % Chromium is indicative of a stainless steel product) has been used for roads and cementitious products as well as agricultural products due to its compositions. However, stainless steel slag can be limited in availability.

Additionally or alternatively, making of agricultural blends from slag sources, especially pelletized agricultural blends, can involve difficulty in dispersion during blending, pellet strength, and combinations thereof.

Applying such agricultural blends can also be difficult. Silicon from different sources, such as different composition slags, can have a different structure. In addition, silicon can have different structures based upon process parameters, such as, the cooling rate of the slag, and/or based upon physical characteristics, such as granular size of the compound. These different structures can affect solubility of compounds containing silicon. Solubility impacts the ability for silicon to be processed by plants and/or the ability to sequester heavy metals. Thus, information about silicon that fails to identify whether the silicon is in a soluble compound can be misleading or unreliable by failing to properly identify the impact of including such silicon. In addition, lacking such information prevents proper identification of preferred minimum ranges of silicon from soluble compounds.

An agricultural blend, an agricultural binder system, and a process of forming an agricultural blend that show improvements would be desirable in the art.

BRIEF DESCRIPTION OF THE INVENTION

In an exemplary embodiment, an agricultural blend includes a binder system having soy polymer and one or both of metal slag by-product and synthetic gypsum.

In another exemplary embodiment, an agricultural binder system includes soy polymer. The agricultural binder system is a powder.

In another exemplary embodiment, a process of forming an agricultural blend includes blending a binder system having soy polymer with one or both of metal slag by-product and synthetic gypsum to form the agricultural blend.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a flow diagram of an exemplary industrial process according to the disclosure.

Wherever possible, the same reference numbers will be used throughout the drawings to represent the same parts.

DETAILED DESCRIPTION OF THE INVENTION

Provided is an agricultural blend and a process of forming an agricultural blend. The agricultural blend can be, can be a portion of, can be a pre-cursor to, or can include a fertilizer, a mineral soil amendment (for example, calcium and magnesium silicate), a soil conditioner (for water and stress management, the enhancement of plant vitality, the improvement of soil water and air movement, nutrient holding capacity, or combinations thereof), a liming agent (for example, calcium and magnesium silicate), an additive to improve soil pH, an additive to decrease metal toxicity issues, or any suitable combination thereof.

Embodiments of the present disclosure include being environmentally-friendly by utilizing waste or by-product streams from one or more industrial processes, having the ability for calcium silicate and/or magnesium silicate to be retained in agricultural substances for longer periods of time, being capable of increasing soil pH, being capable of decreasing metal toxicity (for example, from Al, Mn, or heavy metals), improving cation exchange capacity, improving crop tolerance (for example, to drought, frost, disease, and/or insects by increasing strength of cell wall and/or by further protecting from disease/pathogen attack), improving plant productivity (for example, by increasing the rate and/or amount of photosynthesis through increased production of chlorophyll and/or carbohydrates), decreasing lodging (for example, by increasing structural integrity with increased silicon in roots, shoots, and/or leaves), reducing or eliminating till utilization (for example, by increasing lateral and vertical movement), improving handling (for example, by 25%), improving flow ability (for example, by 15%), improving storability (for example, by 30%), providing increased soluble silicon (for example, greater than about 10 lbs/ton) and combinations thereof.

As shown in FIG. 1, according to an exemplary process 100, in one embodiment, slag 104 produced from an industrial process or from a blast furnace that is a slag-producing process 106 is used in forming an agricultural blend 102, for example, a powder, a granule, and/or an agglomerated solid. The slag-producing process 106 is one unitary process or a combination of processes linked, for example, by transportation of materials. After the slag-producing process 106 forms the slag 104, the slag 104 is processed through any suitable separation process 108 to form one or more slag by-products 110, including the agricultural blend 102. In one embodiment, the one or more slag by-products 110 are a combined flow from more than one source and/or the composition of the one or more slag by-products 110 is adjusted by increasing or decreasing a concentration of one or more of the sources. In one embodiment, the one or more slag by-products 110 are from the slag 104 of various geographic or geologic regions and/or are from sources produced at different periods of time.

In embodiments with the slag-producing process 106 having multiple slag by-products 110, one of the slag by-products 110 is a silicon-containing by-product 111 that is used for the agricultural blend 102; another slag by-product 110 is a separated-slag by-product 112 that is used for a different purpose, such as road material, roofing, cementitious material, engineered fill, acid mine drainage (AMD) remediation, sludge stabilization, and combinations thereof.

The agricultural blend 102 formed by the silicon-containing by-product 111 includes silicon in one or more compounds. The silicon within the agricultural blend 102 is in a soluble compound or a combination of the soluble compound and an insoluble compound. The total silicon in the agricultural blend 102 includes all soluble silicon and insoluble silicon. In some embodiments, the total silicon of the agricultural blend 102 is less than about 30 atomic % or greater than about 39 atomic %. In some embodiments, less than about 25 atomic %, less than about 15 atomic %, between about 5 atomic % and about 25 atomic %, between about 15 atomic % and about 25 atomic %, between about 20 atomic % and about 25 atomic %, between about 1 atomic % and about 5 atomic %, or any suitable combination or sub-combination thereof. Alternatively, in other embodiments, the total silicon of the agricultural blend 102 is between about 40 atomic % and about 53 atomic %, between about 45 atomic % and about 50 atomic %, between about 50 atomic % and about 53 atomic %, greater than about 45 atomic %, greater than about 50 atomic %, or any suitable combination or sub-combination thereof.

Additionally or alternatively, in some embodiments, the silicon from the soluble compound within the agricultural blend 102 is at or above a predetermined amount. For example, in one embodiment, the silicon from the soluble compound in the agricultural blend is between about 10 atomic % and about 20 atomic %, between about 10 atomic % and about 15 atomic %, between about 15 atomic % and about 20 atomic %, between about 12 atomic % and about 15 atomic %, between about 10 atomic % and about 12 atomic %, greater than 10 atomic %, greater than 12 atomic %, greater than 15 atomic %, greater than 20 atomic %, or any suitable combination or sub-combination thereof.

The soluble compound in the agricultural blend 102 is any suitable composition containing silicon and capable of being in solution. For example, in some embodiments, the soluble compound includes a monosilic acid, a polysilic acid, an organosilicon, calcium silicate, calcium inosilicate, or other suitable forms of silicon capable of being in solution. In one embodiment, the soluble compound is any suitable compound having a solubility that is greater than or equal to the least soluble form of calcium silicate. In one embodiment, the soluble compound is any suitable compound capable of travelling through a cell wall of a plant or otherwise available to the plant due to its ability to dissolve. In contrast, in some embodiments, the insoluble compound is silic acid (quartz in solution), amorphous silica, magnesium silicate, coarse or crystalline silicates, or other similar forms of silicon generally incapable of being in solution. In one embodiment, the insoluble compound is any suitable compound having a solubility that is less than or equal to the most soluble form of magnesium silicate. In one embodiment, the insoluble compound is any suitable compound incapable of travelling through a cell wall of a plant or is otherwise unavailable to the plant due to its inability to dissolve.

The application of the agricultural blend 102 treats soil to form treated soil. In this embodiment, the agricultural blend 102 increases the rate of plant growth in the treated soil. The agricultural blend 102 is applied to the soil by any suitable technique to form the treated soil and is absorbed by the plant (for example, in one embodiment, at a concentration substantially equal to that of the concentration of the silicon from the soluble compound in the treated soil). In one embodiment, the agricultural blend 102 is applied through a spreader. In one embodiment, the agricultural blend 102 is applied by banding, for example, by depositing the agricultural blend 102 along with a seed into a furrow in the soil prior to the furrow being closed. In this embodiment, plant growth is unexpectedly at a rate that is even faster than plant growth based upon spreading the agricultural blend 102 without banding.

In one embodiment, the amount of silicon and/or the amount of the soluble compound are determined, for example, in the treated soil formed from the application of the agricultural blend 102 to soil. As used herein, the term "soil" refers to any medium capable of sustaining plant growth or capable of being modified to sustain plant growth. For example, soil includes, but is not limited to, dirt, detritus, clay, rock, gravel, cement, mud, peat, sand, soil-less mixes, other suitable media, or combinations thereof. The determination is of total silicon, silicon from the soluble compound, and/or silicon from the insoluble compound.

In determining silicon from the soluble compound, in one embodiment, an extractor is used for quantifying the amount of the silicon in the soluble compound. In one embodiment, the extractor for extracting the silicon and determining the amount of silicon from the soluble compound is or includes $Na_2CO_3+NH_4NO_3$. In one embodiment, the extracting is performed by drying a sample of the agricultural blend 102 then weighing a predetermined amount of the sample of the agricultural blend 102, for example, about 0.1000 g, then adding the extractor to the sample at a predetermined amount, for example, 50 ml of $Na_2CO_3$ to 10 g/L and/or 50 ml of $NH_4NO_3$ to 16 g/L, prior to agitating/mixing at a predetermined rate, for example, 60 rpm for 1 hour, to form the extracting solution. In this embodiment, the extracting takes up to about five days and then is colorimetrically analyzed, for example, by complexing the silicon with ammonia molybdate and complexing phosphorus with ascorbic acid.

In one embodiment, the determination of the amount of the silicon from the soluble compound takes less than about five days. In a further embodiment, the duration is less than about 1 day, less than about 12 hours, less than about 10 hours, less than about 8 hours, less than about 6 hours, less than about 5 hours, less than about 4 hours, about 1 day, about 12 hours, about 10 hours, about 8 hours, about 6 hours, about 5 hours, about 4 hours, or any suitable combination or sub-combination thereof.

In one embodiment, a bath, such as a water bath, is prepared at a predetermined temperature, for example, within the range of between about 70° C. and about 100° C., between about 80° C. and about 100° C., between about 90° C. and about 100° C., between about 70° C. and about 90° C., between about 80° C. and about 90° C., at about 70° C., at about 75° C., at about 80° C., at about 85° C., at about 90° C., at about 95° C., at about 100° C., or any suitable combination or sub-combination thereof. In one embodiment, the predetermined temperature is selected for highest extraction and lowest loss of the extractor through evaporation.

In one embodiment, the extracting solution including the agricultural blend 102 and the extractor is positioned within the bath for a predetermined duration, for example, at least 30 minutes, at least 1 hour, at least 2 hours, at least 3 hours, at least 4 hours, at least 6 hours, at least 8 hours, about 30 minutes, about 1 hour, about 2 hours, about 3 hours, about 4 hours, about 6 hours, about 8 hours, or any suitable combination or sub-combination thereof. In one embodiment, the predetermined duration is selected for suitability for extraction and/or to avoid diminishing solubility. In one embodiment, a predetermined volume of distilled water is added to the extracting solution to reduce or eliminate silicon precipitation. For example, in one embodiment, about 18 mL of the distilled water is added to about 100 mL of the extracting solution.

In one embodiment, the extracting solution is removed from the bath and allowed to sit for a predetermined waiting time, for example, at least 1 hour, at least 2 hours, at least 3 hours, at least 6 hours, at least 12 hours, at least 15 hours, at least 16 hours, about 1 hour, about 2 hours, about 3 hours, about 6 hours, about 12 hours, about 15 hours, about 16 hours. In one embodiment, the predetermined waiting time is the shortest time permitting the sample to completely cool.

In one embodiment, the determination shows that applying the agricultural blend 102 to the soil increases silicon from the soluble compound in the soil, silicon from the soluble compound in one or more of the plants within the soil, or combinations thereof. In one embodiment, the amount of silicon from the soluble compound in the treated soil is between about 4% and 19% of the total silicon and/or the concentration of the silicon from the soluble compound is at least a predetermined amount, for example, greater than about 15 parts per million, greater than about 20 parts per million, greater than about 30 parts per million, greater than about 40 parts per million, greater than about 50 parts per million, greater than about 60 parts per million, greater than about 70 parts per million, greater than about 80 parts per million, greater than about 90 parts per million, greater than about 100 parts per million, an increase of about 15 parts per million, an increase of about 20 parts per million, an increase of about 30 parts per million, an increase of about 40 parts per million, an increase of about 50 parts per million, an increase of about 60 parts per million, an increase of about 70 parts per million, an increase of about 80 parts per million, an increase of about 90 parts per million, an increase of about 100 parts per million, or any suitable combination or sub-combination thereof. In one embodiment, the amount of an increase in the silicon from the soluble compound corresponds to the type of plant growing, for example, an increase of greater than about 20 parts per million for rice or sugarcane or an increase of greater than about 90 parts per million for wheat.

In one embodiment, the agricultural blend 102 provides silicon to soil, a plant, or a portion of a plant (such as through a cell wall or into a cell wall) that is measurable, for example, through a regulatory body. In one embodiment, the agricultural blend 102 provides silicon that is measurable by an analytical technique approved by the American Association of Plant Food Controlled Officials and/or the Association of Official Analytical Chemists.

In one embodiment, the applying of the agricultural blend 102 to the soil sequesters one or more heavy metals, such as non-toxic metals (for example, iron, cobalt, nickel, copper, manganese, molybdenum, and zinc), toxic metals (for example, mercury, plutonium, barium, and lead), selectively toxic metals (for example, vanadium, tungsten, arsenic, chromium, and cadmium), any other metal having a specific gravity above about 5, or any suitable combination or sub-combination thereof. The heavy metals are sequestered by forming a substantially inert particle including the agricultural blend 102 and the heavy metals. For example, the agricultural blend 102 interacts with and treats the soil such that the heavy metals form inert particles, thereby sequestering the heavy metals.

In one embodiment, the agricultural blend 102 is applied under predetermined conditions for increased effect. For example, in one embodiment, the agricultural blend 102 is applied under acidic soil conditions. In one embodiment, the agricultural blend 102 is applied during a period of increased growth during the life-cycle of the plants in the soil, for example, the spring or the fall, a one-month period, two-month period, or three-month period with higher amounts of moisture and/or sunlight than other periods of similar durations. In one embodiment, the agricultural blend 102 is applied under alkaline soil conditions, for example, when the agricultural blend 102 includes sulfates. In one embodiment, the agricultural blend 102 is applied during a period, such as, a pre-growth period, a post-dormancy period, a dormancy period, a post-harvest period, a fallow period, any other suitable period, or combinations thereof.

The content and/or source of the slag 104 producing the agricultural blend 102 as the slag by-product 110 impacts the compositions of the agricultural blend 102. In one embodiment, the slag-producing process 106 forms a product 114, such as carbon steel, aluminum, phosphate, copper, zinc, non-ferrous material, alloy steel, iron, combustion products and energy (such as from coal), any product that has less than 10 weight % chromium (greater than 10.5 weight % being indicative of a stainless steel product), or any other suitable product. In further embodiments, the product 114 of the slag-producing process 106 has less than about 8%, chromium, less than about 6% chromium, less than about 4% chromium, between about 2% and about 8% chromium, between about 2% and about 6% chromium, between about 4% and about 8% chromium, between about 4% and about 6% chromium, or any suitable combination or sub-combination thereof.

In one embodiment, the slag 104 from the slag-producing process 106 is a metal slag, such as, carbon steel slag, aluminum slag, copper slag, zinc slag, non-ferrous slag, argon oxygen decarburization slag (AOD slag), alloy steel slag, stainless steel slag (for heavy metal sequestration or combined by-products), blast furnace slag (for example, from the production of iron), blast oxygen furnace slag (BOFS), or combinations thereof. In one embodiment, the slag 104 from the slag-producing process 106 is a non-metal slag, such as, phosphate slag or coal slag.

In one embodiment, the slag 104 from the slag-producing process 106 is copper slag and/or has a general composition including, by weight, between about 30% and about 40% $SiO_2$, between about 5% and about 10% CaO, between about 1% and about 5% MnO, between about 2% and about 4% $Al_2O_3$, between about 2% and about 3% Zn, a balance of Fe, and incidental impurities.

In one embodiment, the slag 104 from the slag-producing process 106 is zinc slag and/or has a general composition including, by weight, about 20% FeO, about 15% CaO, about 20% $SiO_2$, about 5% $Al_2O_3$, about 10% PbO, a balance ZnO, and incidental impurities.

In one embodiment, the slag 104 from the slag-producing process 106 is non-ferrous slag and/or has a general composition including, by weight, about 15% CaO, about 15% $SiO_2$, about 5.4% $Al_2O_3$, about 1.3% MgO, about 1.1% $K_2O$, about 0.9% $Na_2O$, about 4.8% Zn, about 2.0% Pb, a balance FeO, and incidental impurities. In a further embodiment, the slag 104 includes, by weight, about 15% CaO, about 15% $SiO_2$, about 5.4% $Al_2O_3$, about 1.3% MgO, about 1.1% $K_2O$, about 0.9% $Na_2O$, about 4.8% Zn, about 2.0% Pb, about 0.7% C, about 0.6% Cu, about 0.4% $SO_4^{2-}$, about 0.4% MnO, about 0.2% $TiO_2$, about 0.2% $PO_4^{3-}$, trace components (such as, about 0.1% B, about 0.04% SrO, and about 0.04% $Cl^-$) a balance FeO, and incidental impurities.

In one embodiment, the slag 104 from the slag-producing process 106 is blast furnace slag and/or has a general composition including, by weight, between about 32% and about 45% CaO, between about 5% and about 15% MgO, between about 32% and about 42% $SiO_2$, between about 7% and about 16% $Al_2O_3$, between about 1% and about 2% S, between about 0.1% and about 1.5% $Fe_2O_3$, between about 0.2% and about 1.0% MnO, and incidental impurities. In a further embodiment, the slag 104 has a composition including, by weight, of between about 5% and about 15% MgO, between about 32% and about 42% $SiO_2$, between about 7% and about 16% $Al_2O_3$, between about 1% and about 2% S, between about 0.1% and about 1.5% $Fe_2O_3$, between about 0.2% and about 1.0% MnO, a balance of CaO, and incidental impurities.

In one embodiment, the slag 104 from the slag-producing process 106 is coal slag and/or has a general composition including, by weight, about 48% $SiO_2$, about 10% $Al_2O_3$, about 14% CaO, about 7.4% $Fe_2O_3$, about 6.2% MgO, about 1.6% $Na_2O$, about 1.6% $K_2O$, and incidental impurities.

In one embodiment, the slag 104 from the slag-producing process 106 is phosphate slag and/or has a general composition including, by weight, about 16% to about 19% $P_2O_5$ (for example, in the form $4CaO.P_2O_5.CaSiO_3$), about 4% to about 12% MgO, a balance CaO, and incidental impurities. In another embodiment, the slag 104 from the slag-producing process 106 is phosphate slag and/or has a general composition including, by weight, between about 39% and about 42% $SiO_2$, up to about 3.5% $Al_2O_3$, up to about 0.5% $Fe_2O_3$, up to about 2% $P_2O_5$, a balance CaO, and incidental impurities.

In one embodiment, the slag 104 from the slag producing process 106 is a steel slag and/or has a general composition including, by weight, between about 10% and about 19% $SiO_2$, between about 1% and about 3% $Al_2O_3$, between about 5% and about 10% MgO, between about 10% and about 40% Fe (for example, from FeO or $Fe_2O_3$), between about 5% and about 8% MnO, a balance CaO, and incidental impurities. In a further embodiment, the slag 104 includes, by weight, between about 10% and about 19% $SiO_2$, between about 1% and about 3% $Al_2O_3$, between about 5% and about 10% MgO, between about 10% and about 40% Fe (for example, from FeO or $Fe_2O_3$), between about 5% and about 8% MnO, about 0.5% $TiO_2$, between about 0.5% and about 1% $P_2O_5$, a balance CaO, and incidental impurities.

In one embodiment, the slag 104 from the slag producing process 106 is AOD slag and/or has a general composition including, by weight, between about 6% and about 8% $Al_2O_3$, between about 1% and about 3% $Cr_2O_3$, up to about 1% $Fe_2O_3$, between about 0.5% and about 6% FeO, between about 4% and about 6% MgO, between about 22% and about 29% $SiO_2$, a balance CaO, and incidental impurities. In a further embodiment, the slag 104 includes, by weight, between about 6% and about 8% $Al_2O_3$, between about 1% and about 3% $Cr_2O_3$, up to about 1% $Fe_2O_3$, between about 0.5% and about 6% FeO, between about 4% and about 6% MgO, between about 0.8% and about 1% MnO, between about 22% and about 29% $SiO_2$, a balance CaO, and incidental impurities.

In one embodiment, the slag 104 from the slag producing process 106 is BOFS and/or has a general composition including, by weight, between about 15% and about 35% FeO, between about 10% and about 20% $SiO_2$, up to about 10% $Al_2O_3$, up to about 10% MgO, up to about 10% MnO, up to about 2% $P_2O_5$, up to about 2% $Cr_2O_3$, a balance CaO, and incidental impurities.

In one embodiment, the agricultural blend 102 includes silicon, calcium, and magnesium, for example, as a combination of calcium silicate and magnesium silicate. In one embodiment, the agricultural blend 102 further includes calcium between about 26 atomic % and about 28 atomic % and magnesium between about 6 atomic % and about 8 atomic %, with the balance being other constituents from the slag 104.

The agricultural blend 102 is capable of being in any suitable form for delivery to plants, soil, or other agricultural substances. In one embodiment, the agricultural blend 102 is blended together, for example, by a high-speed blender 116. In one embodiment, the agricultural blend 102 is a colloidal suspension.

In one embodiment, the agricultural blend 102 is pelletized or agglomerated, for example, by introducing a binder system 118 to the agricultural blend 102 and pelletizing with a pelletizing disc 126 capable of varying speed and angle of rotation, thereby forming a processed version of a pelletized agricultural blend 120. The binder system 118 includes a property of promoting pellet strength when used for forming agricultural pellets, includes a property of promoting dispersion when used for blending agricultural binders, includes a property of being compatible with calcium silicate, includes other suitable properties, and combinations thereof.

In one embodiment, the agricultural blend 102 includes or is formed using the binder system 118. The binder system 118 includes a carbohydrate sugar, such as, beet juice, corn starch, molasses, calcium citrate, condensed fermentation residual, soy polymer, or combinations thereof, mixed with water. In one embodiment, the carbohydrate sugar further includes protein.

The binder system 118 includes a predetermined volumetric concentration of the carbohydrate sugar and the water. In one embodiment, the predetermined volumetric concentration of the binder system 118 includes between about 50 volume % and about 70 volume % being the carbohydrate sugar, between about 60 volume % and about 70 volume % being the carbohydrate sugar, between about 50 volume % and about 60 volume % being the carbohydrate sugar, between about 55 volume % and about 60 volume % being the carbohydrate sugar, between about 50 volume % and about 55 volume % being the carbohydrate sugar, about 50 volume % being the carbohydrate sugar, about 55 volume % being the carbohydrate sugar, about 60 volume % being the carbohydrate sugar, or combinations and sub-combinations Thereof.

In one embodiment, the binder system 118 is applied based upon a predetermined weight concentration of the agricultural blend 102. In one embodiment, the carbohydrate sugar of the binder system 118 is between about 3 weight % and about 10 weight % of the agricultural blend 102, between about 3 weight % and about 8 weight % of the agricultural blend 102, between about 4.5 weight % and about 10 weight % of the agricultural blend 102, between about 3 weight % and about 6 weight % of the agricultural blend 102, between about 4 weight % and about 5 weight % of the agricultural blend 102, greater than about 3 weight % of the agricultural blend 102, at about 4.5 weight % of the agricultural blend 102, or any combination or sub-combination Thereof.

Additionally or alternatively, in some embodiments, other components, additives, micronutrient packets 130, sulfate sources 122, or combinations thereof are introduced to the agricultural blend 102.

In one embodiment, the micronutrient packet 130 is added to the agricultural blend 102 during the formation of the agricultural blend 102 and/or after the formation of the agricultural blend 102. In one embodiment, the micronutrient packet 130 includes boron, copper, zinc, iron, manganese, and molybdenum. Additionally or alternatively, in other embodiments, macronutrients (such as, nitrogen, phosphorus, and/or potassium) and/or nutrients (such as, calcium, magnesium, and/or sulfur) are added to the agricultural blend 102. In one embodiment, the micronutrient packet 130, the macronutrients, and/or the nutrients are added by a second by-product (not shown) from a process, such as those described above.

For example, in one embodiment, a nutrient such as sulfate from the sulfate source 122 from a sulfate-producing process 124 is added to the agricultural blend 102 during the formation of the agricultural blend 102 and/or after the formation of the agricultural blend 102.

In one embodiment, the agricultural blend 102 includes the sulfate source 122 and calcium silicate. The sulfate source 122 can be any suitable non-hazardous sulfate source including, but not limited to, gypsum. The gypsum can be mined, synthetic, or a combination thereof. Using mined gypsum, synthetic gypsum, and combinations of mined gypsum and synthetic gypsum permits the effects of the structure of the gypsum to be controlled and/or adjusted.

The synthetic gypsum is from the sulfate-producing process 124 (such as, a portion of the slag-producing process 106 or separate process). For example, in one embodiment, the sulfate-producing process 124 forming the synthetic gypsum is a by-product of flue gas desulfurization in a coal combustion process. Additionally or alternatively, in one embodiment, the sulfate source 122 is a by-product of other industrial processes. For example, in one embodiment, the sulfate source 122 is a by-product formed from slag in a coal combustion process, a by-product formed from bottom-boiler ash in a coal combustion process, a by-product formed from hydrogen sulfide produced from a pickling liquor, or any suitable combination thereof.

In one embodiment, the composition of the agricultural blend 102 includes about 75 weight % to about 95 weight % being the sulfate source 122 and about 5 weight % to about 25 weight % being calcium silicate or the silicon-containing by-product 111 of the slag 104. In one embodiment, the agricultural blend 102 includes about 88.5 weight % being the sulfate source 122 and about 12.5 weight % calcium silicate or the silicon-containing by-product 111 of the slag 104. In one embodiment, a combined wet blend of the agricultural blend 102 includes about 5 atomic % to about 6 atomic % $H_2O$, about 4 atomic % to about 6 atomic % magnesium, about 17 atomic % to about 19 atomic % sulfur, and a balance calcium. In one embodiment, the combined wet blend includes about 5.6 atomic % $H_2O$, about 22.2 atomic % calcium, about 0.05 atomic % magnesium, and about 17.5 atomic % sulfur. In one embodiment, a combined dry blend of the agricultural blend 102 includes about 22 atomic % to about 26 atomic % calcium, about 0.04 atomic % to about 0.06 atomic % magnesium, and about 17.5 atomic % to about 19.5 atomic % sulfur. In one embodiment, the dry blend includes about 23.5 atomic % calcium, about 0.05 atomic % magnesium, and about 18.5 atomic % sulfur. In one embodiment, the pH of the agricultural blend 102 can be about 7.5 to 8.5 or about 8.1. However, in another embodiment, the pH is greater than 8.5 by including additional ammonium sulfate as described below.

In one embodiment, the sulfate source 122 includes ammonium sulfate. In this embodiment, ammonia is used as a reactant in the sulfate-producing process 124 (such as, flue gas desulfurization in coal combustion) to yield $(NH_4)_2SO_4$ (ammonium sulfate). The pH of the resulting agricultural blend 102 is higher than embodiments with the sulfate source 122 being from gypsum, thereby permitting a blending to achieve a desired pH.

In one embodiment, the sulfate-producing process 124 is coal combustion. Coal includes sulfur oxides (SOx). Monitoring emissions in coal combustion involves monitoring whether SOx is being emitted. To reduce SOx, various scrubbers or other systems remove sulfur, sulfates, sulfites, sulfur trioxide, sulfur dioxide, or other sulfur-containing compounds. The SOx reduced and/or removed by flue gas desulfurization includes circulating of a flue gas to remove sulfur from the flue gas and generating a sulfur-containing by-product. There are two different methods of performing flue gas desulfurization that produce the sulfate source 122. In a first method (assuming ideal operating conditions), wet scrubbing is performed with a $CaCO_3$ slurry (for example, a limestone slurry) to produce $CaSO_3$ (calcium sulfite):

$$CaCO_3(\text{solid}) + SO_2(\text{gas}) \rightarrow CaSO_3(\text{solid}) + CO_2(\text{gas}) \tag{1}$$

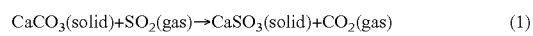

In a second method (assuming ideal operating conditions), wet scrubbing is performed with a $Ca(OH)_2$ slurry (for example, a lime slurry) to produce $CaSO_3$ (calcium sulfite):

$$Ca(OH)_2(\text{solid}) + SO_2(\text{gas}) \rightarrow CaSO_3(\text{solid}) + H_2O(\text{liquid}) \tag{2}$$

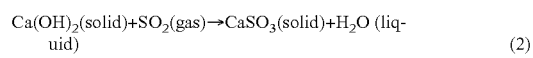

After the $CaSO_3$ (calcium sulfite) is formed (either under the first method or the second method), it undergoes a forced oxidation process which converts it to the sulfate source 122, $CaSO_4$ (for example, synthetic gypsum):

$$CaSO_3(\text{solid}) + H_2O(\text{liquid}) + \tfrac{1}{2}O_2(\text{gas}) \rightarrow CaSO_4(\text{solid}) + H_2O \tag{3}$$

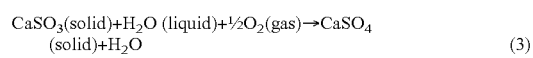

In operation, the lime or limestone slurry is present with the synthetic gypsum after the flue gas desulfurization. Depending upon the concentration of sulfur in the coal and the other limiting aspects of the reactions, the sulfate source 122 includes a predetermined amount of synthetic gypsum and lime or limestone. In one embodiment, the sulfate source 122 includes about 90 weight % to about 95 weight % calcium sulfate ($CaSO_4 \cdot 2H_2O$), about 1 weight % to about 2 weight % calcium sulfite ($CaSO_3 \cdot \tfrac{1}{2}H_2$), and about 2 weight % to about 3 weight % calcium carbonate ($CaCO_3$). In one embodiment, the remaining portion includes magnesium sulfate/sulfite.

In one embodiment, the sulfate source 122 is further processed to achieve desired physical properties prior to being introduced to the agricultural blend 102. For example, in one embodiment, the sulfate source 122 is filtered through one or more mesh stages. In one embodiment, 99% of the by-product is smaller than #20 mesh, 90% of the by-product is smaller than #60 mesh, 75% of the by-product is smaller than #100 mesh. Additionally or alternatively, in one embodiment, moisture content of the sulfate source 122 is adjusted to a predetermined range (for example, by mechanical watering devices, filters, centrifuges, or combinations thereof). In one embodiment, the predetermined range of moisture content is between about 10% and about 18%, between about 10% and about 15%, between about 7% and about 12%, between about 5% and about 7%, or at about 5%. In one embodiment, the lime or limestone forms about 90% to about 99% of the sulfate source 122. In another embodiment, the gypsum forms about 90% to about 99% of the sulfate source 122.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural blend, comprising:
   a binder system having soy polymer; and
   metal slag by-product, wherein the slag by-product has been produced from slag by a separation process.

2. The agricultural blend of claim 1, wherein the agricultural blend is a powder.

3. The agricultural blend of claim 1, wherein the metal slag by-product is selected from the group consisting of carbon steel slag by-product, aluminum slag by-product, copper slag by-product, zinc slag by-product, non-ferrous slag by-product, argon oxygen decarburization slag by-product (AOD slag by-product), alloy steel slag by-product, stainless steel slag by-product, blast furnace slag by-product (for example, from the production of iron), blast oxygen furnace slag by-product (BOFS), and combinations thereof.

4. The agricultural blend of claim 1, wherein the binder system is a portion of an agricultural pellet, thereby promoting pellet strength within the agricultural pellet.

5. The agricultural blend of claim 1, wherein the agricultural blend comprises calcium silicate.

6. The agricultural blend of claim 1, wherein the agricultural blend comprises a sulfate source.

7. The agricultural blend of claim 1, wherein the agricultural blend comprises synthetic gypsum.

8. The agricultural blend of claim 1, wherein the concentration of the binder system is between about 50 volume % and about 70 volume %.

9. The agricultural blend of claim 1, wherein the concentration of the binder system is between about 60 volume % and about 70 volume %.

10. The agricultural blend of claim 1, wherein the concentration of the binder system is between about 50 volume % and about 60 volume %.

11. The agricultural blend of claim 1, wherein the concentration of the binder system is between about 55 volume % and about 60 volume %.

12. The agricultural blend of claim 1, wherein the concentration of the binder system is between about 50 volume % and about 55 volume %.

13. The agricultural blend of claim 1, wherein the concentration of the binder system is between about 3 weight % and about 10 weight % of the agricultural blend.

14. The agricultural blend of claim 1, wherein the concentration of the binder system is between about 3 weight % and about 8 weight %.

15. The agricultural blend of claim 1, wherein the concentration of the binder system is between about 4.5 weight % and about 10 weight %.

16. The agricultural blend of claim 1, wherein the concentration of the binder system is between about 3 weight % and about 6 weight % of the agricultural blend.

17. The agricultural blend of claim 1, wherein the concentration of the binder system is between about 4 weight % and about 5 weight % of the agricultural blend.

18. The agricultural blend of claim 1, wherein the concentration of the binder system is greater than about 3 weight % of the agricultural blend.

19. A process of forming an agricultural blend, the process comprising:
    blending a binder system having soy polymer with metal slag by-product to form the agricultural blend, wherein the slag by-product has been produced from slag by a separation process.

20. The process of claim 19, further comprising blending the binder system and the metal slag by-product with synthetic gypsum.

* * * * *